United States Patent [19]

Hodgen et al.

[11] 3,801,155

[45] Apr. 2, 1974

[54] ROTARY SEAT BACK ADJUSTER

[75] Inventors: Loran M. Hodgen; Gary L. Weimer, both of Elkhart, Ind.

[73] Assignee: Excel Industries, Inc., Elkhart, Ind.

[22] Filed: July 7, 1972

[21] Appl. No.: 269,548

[52] U.S. Cl. .................................. 297/374, 16/140
[51] Int. Cl. ........ B60n 1/04, B60n 1/02, G05g 5/06, E05d 11/18
[58] Field of Search .......... 297/357, 366, 374, 379; 16/140, 146; 74/531, 804, 805

[56] References Cited
UNITED STATES PATENTS

| | | | |
|---|---|---|---|
| 3,515,433 | 6/1970 | Tabor | 297/374 |
| 3,216,766 | 11/1965 | Tabor | 297/374 |
| 3,423,785 | 1/1969 | Pickles | 297/374 |

Primary Examiner—Casmir A. Nunberg
Attorney, Agent, or Firm—Whittemore, Hulbert & Belknap

[57] ABSTRACT

The seat back adjuster includes a rotary multiple friction plate mechanism with relatively rotatable parts secured to a seat and tiltable seat back, respectively, which is normally locked by a spring urged ball-and-cam arrangement which exerts axial pressure on the friction plates. A cam and lever manual control releases the axial pressure to permit seat adjustment.

3 Claims, 8 Drawing Figures

PATENTED APR 2 1974

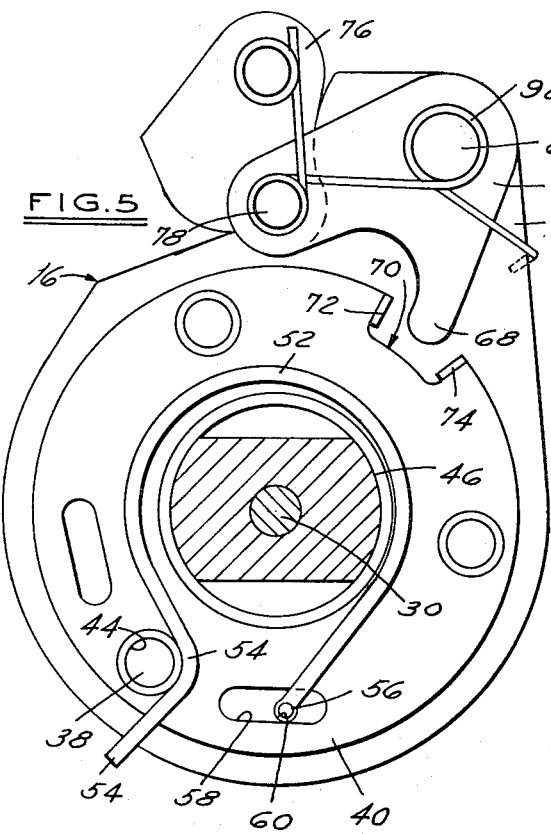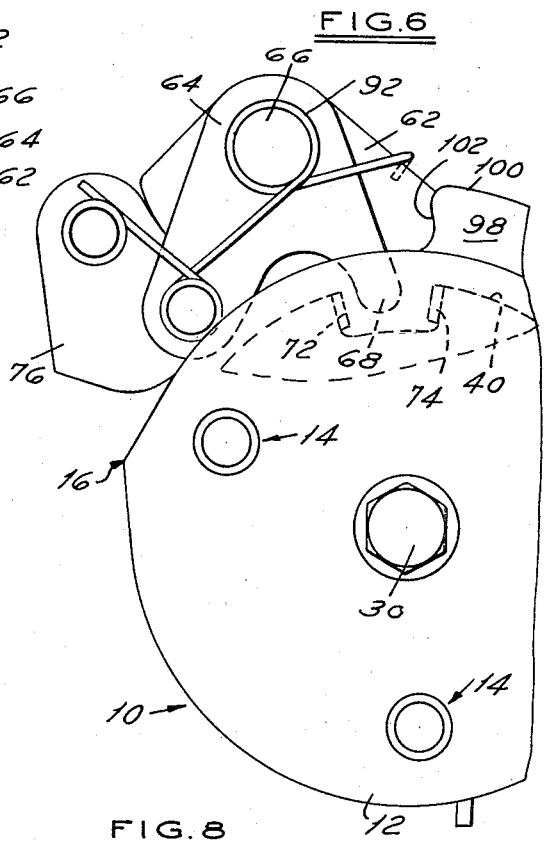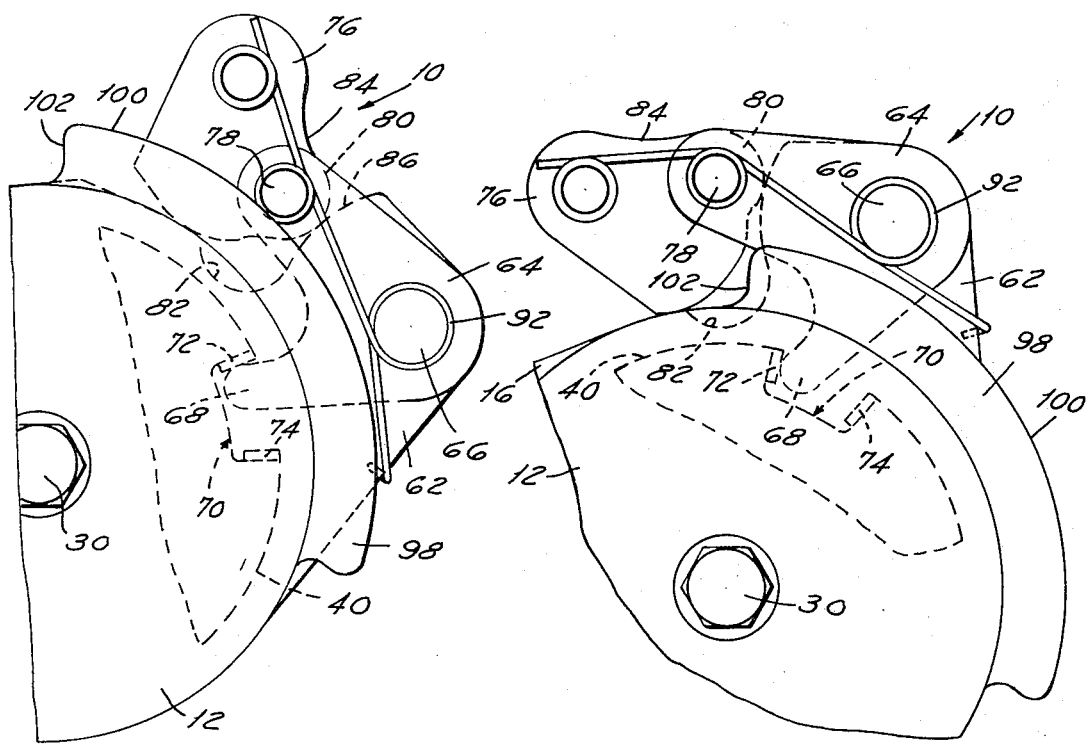

3,801,155

ROTARY SEAT BACK ADJUSTER

BACKGROUND OF THE INVENTION

Many different styles of seat back adjusters have been proposed in the past for reclining seat backs in automobiles, buses and the like. The majority of the previous adjusters have operated on the principle of a ratchet-and-pawl mechanism. Ratchet-and-pawl mechanisms provide a limited number of adjusted positions depending upon the number and sapcing of the teeth. Additionally, such prior art ratchet-and-pawl type adjusters have been somewhat noisy and have been subject to rapid wear.

In U. S. Pat. No. 3,515,433, issued June 2, 1970, a rotary seat back adjuster is disclosed which overcomes many of the above objects. However, the device therein disclosed has proved to have been somewhat difficult to manaully manipulate. The present invention constitutes an improvement thereover wherein novel cam and lever means are provided to facilitate manual manipulation of the device.

SUMMARY OF THE INVENTION

The rotary seat back adjuster comprises a stack of circular friction plates alternately mounted on inner and outer relatively rotatable members, one member being secured to an automobile seat frame and the other being secured to a tiltable seat back frame. Pressure is applied to the plates, to lock the mechanism, by relative rotation between a cage carrying balls and an element having cam surfaces, the cage being spring-urged to rotate in a direction to normally frictionally lock the plates together. Manual cam and lever means are provided for overcoming the force of the spring and rotating the ball cage out of its locking position. Further positive locking means are provided for positively locking the seat back against forward movement when in an adjusted position and for holding the balls released from the friction plates during a predetermined range of forward swinging movement of the seat back.

IN THE DRAWINGS:

FIG. 5 is an elevational view of the rotary seat back adjuster looking towards the right in FIG. 2 with the housing, interleaved friction plate structure and central hub removed to reveal the structure therebehind;

FIG. 6 is a view of the structure looking towards the right in FIG. 2 and illustrating the adjuster in a position to hold a seat back at substantially a 45° rearwardly reclined position and in the locked condition;

FIG. 7 is a view similar to FIG. 6 but illustrating the adjuster in a position positioning a seat back at substantially a 45° forwardly inclined position with the adjuter being in the unlocked condition; and FIG. 8 is a view similar to FIG. 6 illustrating the adjuster set to hold the seat back in a substantially vertical position with the adjuster being in the unlocked condition.

DESCRIPTION OF A PREFERRED EMBODIMENT

Figure 1:
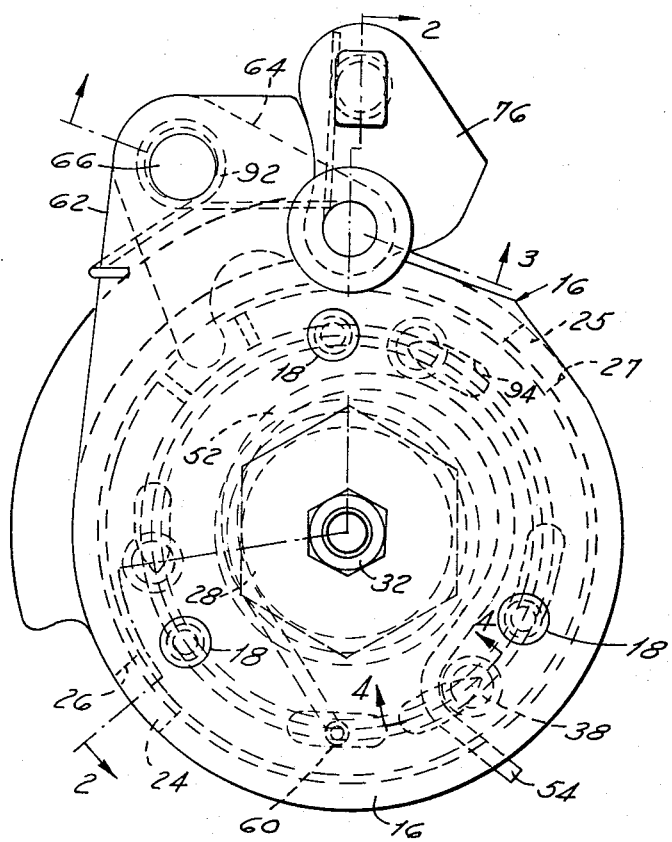
FIG. 1 is an elevational view of one embodiment of the rotary seat back adjuster of the present embodiment.

FIGS. 1-5 illustrate the structure of the rotary seat back adjuster 10. The adjuster 10 is adapted to be connected between a conventional tiltable automobile seat back which is pivotally mounted on a seat frame fixedly secured to the vehicle body. The adjuster 10 includes a cup-shaped housing 12 having three spaced apart rhreaded openings 14 on the front face thereof. The openings 14 are for the reception of threaded fastening means to secure the housing 12 to suitable support structure provdied on a seat frame.

A plate 16 is provided on the opposite side of the adjuster. The plate 16 also has a plurality of spaced apart threaded openings 18 for the reception of threaded fastening means to secure the plate 16 to structure associated with a tiltable seat back to thus connect the adjuster between a seat frame and its seat back.

Figure 2:
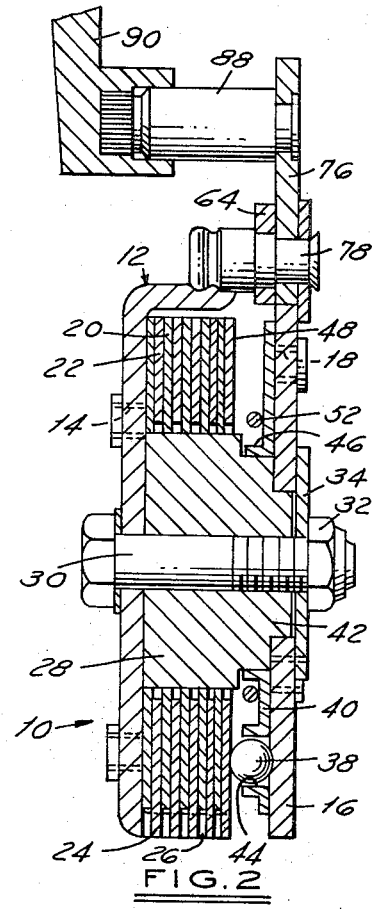
FIG. 2 is a sectional view taken substantially along the line 2—2 of FIG. 1 looking in the direction of the arrows.
Figure 3:
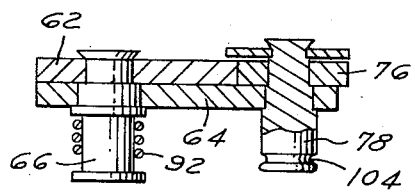
FIG. 3 is a sectional view taken substantially along the line 3—3 of FIG. 1 looking in the direction of the arrows.

Two sets of circular interleaved friction plates 20,22 are positioned within the cup-shaped housing 12. The plates 20 alternate with the plates 22 in the interleaving fashion. One set of plates 20 is operatively connected to the cup-shaped housing 12 by means of oppositely disposed peripherally extending tabs 24, 25 which are received in slots 26,27 provided in the cylindrical housing outer wall (FIGS. 1 and 2). The other set of plates 22 terminate short of the outer wall so as not to be in fractional engagement therewith.

The set of plates 22 is received on a central hub 28. The hub 28 has a hexagonal outer periphery (FIG. 1). Openings are provided in the plates 22 matching the outer peripheral contour of the hub 28 whereby the plates 22 rotate with the hub 28. The plates 20 have central circular openings therethrough of larger diameter than the hub 28 so as not to contact the hub 28 during relative rotation of the sets of plates. As will be appreciated, while the plates 20, 22 are fixed for rotation with, respectively, the housing 12 and hub 28, these plates are free to slide longitudinally into and out of frictional engagement with each other to thereby permit relative rotation of the housing 12 and plate 16.

A cam operated wedging structure, including three spaced apart balls 38 which are provided between the interleaved plates 20, 22 and plate 16, is utilized for applying pressure to the plates 20, 22 to cause frictional engagement thereof for locking the adjuster 10 in a given position, the pressure being relievable to permit angular adjustment as desired.

This wedging structure includes a ball cage 40 which is received on circular intermediate portion 42 of the hub 28. The ball cage is fabricated from sheet metal and is formed with three spaced apart openings 44 each of which loosely receives one of the balls 38. The ball cage 40 is provided with a central opening including a flange 46 for journaling on the circular portion 42 of the hub. The balls 38 bear against an annular pressure plate 48 which is keyed to the housing 12 by means of tabs 50 which extend into the aforementioned slots.

A U-shaped spring 52 is received around the hub portion 42. One end of one leg of the spring is formed into a hook 54 which engages the wall defining one of the openings 44. The outer end 56 of the other leg of the spring is bent at right angles thereto and extends through a slot 58 formed in the ball cage 40 and thence through a circular opening 60 provided in the plate 16 to thereby be anchored to the plate 16 but movable in the slot 58. The spring 52 thus tends to bias the ball cage 40 in a clockwise direction with respect to the plate 16 as viewed in FIG. 5.

The plate 16 is generally circular in shape but is provided with a radially outwardly extending projection 62 along a portion of the periphery thereof. A lever 64 is pivotally mounted on projection 62 by means of a pin 66. The lever includes a rounded finger 68 which extends loosely into a notch 70 having upstanding end walls 72, 74, the end wall 72 being for camming engagement with the finger 68.

The end of the lever opposite the pin 66 is pivotally connected to a cam element 76 by means of a pin 78. The cam element 76 includes a rounded cam lobe 80 which is receivable in a similarly rounded notch 82 (FIG. 8) provided in the periphery of the plate 16 at the juncture of the projection 62 therewith. Matched curved surfaces 84, 86 (FIG. 7) extend, respectively, from the lobe 80 and notch 82 on the cam element 76 and projection 62. These surfaces 84, 86 are configured in the shape of an arc of a circle and are utilized as camming surfaces. A pin 88 is secured to the outer end of the cam element 76 and a manually operable handle 90 (FIG. 2) is secured to the outer end of the pin 88 for manipulating the cam element 76 to unlock the adjuster 10 to permit tilting of the seat back either rearwardly or forwardly.

A spring 92 is arranged to bias the lever 64 and cam element 76 to the position shown in FIGS. 5 and 6 wherein the finger 68 is out of contact with the wall 72. In this position, the other spring 52 biases the ball cage 40 to a position where the adjuster 10 is locked.

Figure 4:
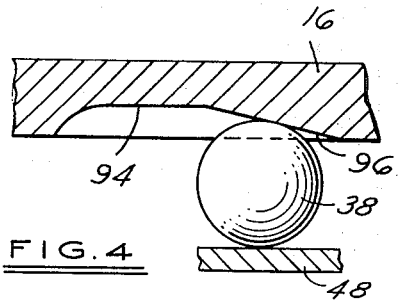
FIG. 4 is a sectional view taken substantially along the line 4—4 of FIG. 1 looking in the direction of the arrows.

The means for locking and unlocking the adjuter 10 will now be described. As previously stated, the balls 38 bear against pressure plate 48 with the spring 52 urging the ball cage to rotate in a clockwise direction as viewed in FIG. 5. On the outer side of the ball cage 40, the balls extend into sloping grooves 94 provided in the plate 16 (FIGS. 1 and 4). The grooves are so arranged that their cam or ramp ends 96 engage the balls 38 in a wedging action when the cage 40 is rotated clockwise as viewed in FIG. 5 with the result that the balls ride up the ramps 94 and exert axial inward pressure on the friction plates 20, 22 to frictionally lock the hub 28 against rotation relative to the housing 12 and thereby lock the seat back against tilting movement.

As will be noted in FIGS. 6, 7 and 8, an arcuate flange 98 extends radially outwardly from the housing member 12. The flange 98 has an outer edge 100 and an end edge 102. The end edge 102 is positioned adjacent to the lever and cam elements 64, 76 when the adjuster is in the normal position with the seat back upright as in FIG. 5. The flange 98 is utilized to maintian the adjuster in the unlocked condition when the seat back is tilted or dumped forwardly to allow a passenger to get into the rear seat of a two-door sedan (FIG. 7). The seat back may be returned to the upright position after being dumped forwardly without manipulating the adjuster 10 to unlock it.

Operation of the adjuster may now be understood. As previously explained, when the lever 64 and cam element 76 are in the position illustrated in FIG. 5 or 6, the spring 52 biases the ball cage 40 to a position wherein the balls 38 exert sufficient pressure against the friction plates 20, 22 to lock the adjuster so that the plate 16 and housing 12 cannot move relative to one another.

If it is wished to tilt the seat back rearwardly as illustrated in FIG. 6, the handle 90 is manipulated as in FIG. 8 to cause the cam element 76 to slide up the projection 62 thus pivoting the lever 64 causing the finger 68 to engage the wall 72 and rotate the ball cage 40 in the clockwise direction as viewed in FIG. 8. This results in relieving pressure of the balls 38 against the friction plates 20, 22 thus permitting relative rotation of the housing 12 and plate 16.

The seat back may then be tilted rearwardly. When it is tilted to the desired angle (FIG. 6 illustrates an angle of 45° with respect to the vertical), the handle 90 is released. The spring 92 then will bias the lever 64 and cam element 76 back down the projection 62 whereupon the lobe 80 will enter the notch 82 with the surfaces 84, 86 being in abutment as shown in FIG. 5. The finger 68 is pivoted away from the end wall 72 thus permitting the spring 52 to return the ball cage 40 to a position wherein the balls 38 again exert pressure against plates 20, 22 to lock the adjuster.

When it is desired to tilt the seat back forwardly, the handle 90 is again manipulated as illustrated in FIG. 8 to cause the lever 64 to relieve the pressure on the balls 38 thus freeing the friction plates 20, 22 for relative rotation. The seat back is then tilted forwardly. During the forward tilt of the seat, the pin 78 which pivotally connects the cam element 76 to the lever 64 rides on the outer edge 100 of the flange 98. A groove 104 is supplied in the pin for spring 92. When the handle 90 is released, the spring 92 is ineffective to bias the lever 64 and cam element 76 back to their initial positions because the flange 98 bears against the pin 78 thus maintaining it in the position illustrated in FIG. 7 as long as the seat back is forwardly inclined. When it is desired to return the seat back to its original position, it is merely pushed rearwardly without the necessity for additional maniuplation of the handle 90.

With the parts in the position illustrated in FIGS. 5 and 6, the spring 52 applies sufficient pressure to the balls 38 so that the friction plates 20, 22 lock the adjuster. Any effort to forcibly tilt the seat back rearwardly without manipulation of the handle 90 will urge the plate 16 to cam the balls 38 axially inwardly and thus bind the friction plates even more tightly together. Lost motion between the finger 68 and a loose fit of the plates 22 on the hub 28 aid in promoting additional wedging action. However, the seat back may be pushed from a rearwardly reclining position to an upright position without manipulation of the handle 90. Relatively small forces acting against a seat back in the forward direction are effective to cause the balls 38 to move downwardly off the ramps 94 and thus relieve the friction plates 20, 22 of pressure to permit the seat back to be pushed forwardly to the upright position.

What we claim as our invention is:

1. A rotary seat back adjuster for a tiltable seat back comprising a first member adapted to be secured to a seat frame and defining an axis, a first plurality of friction plates axially slidable along said first member but held against rotation thereon about said axis, a second member adapted to be secured to a seat back mounted for rotation about said axis, a second plurality of friction plates axially slidable on said second member but held against rotation thereon about said axis, the plates of said first and second pluralities of friction plates being mutually interleaved and defining a stack of plates, means at one end of said stack limiting said axial sliding movement of said plates in one direction, a ball cage mounted on one of said members for rotation about said axis, balls carried by said cage and bearing at one side on the outer end of said stack of plates and at the other side on cam means of said one member, resilient means urging said cage to rotate in a direction to cause said cam means to press said balls axially against said stack and thereby frictionally lock said members against relative rotation, a lever pivotally mounted on said one of said members and having an end portion operatively engaging said cage for rotating said cage in a direction opposing the action of said resilient means and thereby relieve said stack from pressure from said balls, a cam element pivotally connected to said lever, said cam element having a cam surface, said one of said members having a cam surface in camming engagement with the cam surface of said cam element, and manually operable means connected to said cam element for comming said element along a path defined by said two cam surfaces to rotate the lever and cause it to rotate said cage as described, a lobe on said cam element one of said members having a mating notch therein to receive said lobe and lock the cam element against movement excepting by means of said manually operable means.

2. A rotary seat back adjuster for a tiltable seat back comprising a pair of members relatively rotatable about a common axis and adapted to be respectively secured to a seat and a tiltable seat back, releasable friction means between said members normally frictionally resisting relative rotation between said members, a lever pivotally mounted on one of said members and having an end portion operably engaging said friction means for releasing said friction means upon pivoting of the lever, a cam element, a pin pivotally connecting the cam element to said lever, said cam element having a cam surface, said one of said members having a cam surface in camming engagement with the cam surface of said cam element, manually operable means connected to said cam element for camming said element along a path defined by said two cam surfaces to rotate the lever and cause it to release said friction means, an arcuate radial flange on the other member and having an end edge engageable with said pin to positively lock said members against relative rotation in one direction when said friction means are in engagement, said flange having a peripheral edge for engaging said pin and holding said manually operable means in a position releasing said friction means while said members are relatively rotating through the arcuate extent of said flange, a lobe on said cam element, one of said members having a mating notch therein to receive said lobe and lock the cam element against movement excepting by means of said manually operable means.

3. A rotary seat back adjuster as defined in claim 2, further characterized in that said cam element has a curved surface for engagement with said one of said members when said members are relatively rotated through the arcuate extent of said flange.

* * * * *